United States Patent [19]

Matsuhashi

[11] Patent Number: 4,468,649

[45] Date of Patent: Aug. 28, 1984

[54] SWITCHABLE PERMANENT MAGNETIC CHUCK

[75] Inventor: Takeo Matsuhashi, Ueda, Japan

[73] Assignee: Kanetsu Kogyo Kabushiki Kaisha, Nagano, Japan

[21] Appl. No.: 549,994

[22] Filed: Nov. 8, 1983

[30] Foreign Application Priority Data

Nov. 24, 1982 [JP] Japan .................. 57-176486[U]

[51] Int. Cl.³ .............................................. H01F 7/04
[52] U.S. Cl. .................................... 335/295; 335/285
[58] Field of Search ............... 335/285, 286, 295, 302, 335/306

[56] References Cited

U.S. PATENT DOCUMENTS

| 3,010,054 | 11/1961 | Goudsmit | 335/295 |
| 3,179,858 | 4/1965 | Binder et al. | 335/295 |
| 3,336,551 | 8/1967 | Stead | 335/295 |
| 3,775,717 | 11/1973 | Braillon | 335/295 |
| 4,356,467 | 10/1982 | Cardone et al. | 335/295 |
| 4,379,277 | 4/1983 | Braillon | 335/295 |

FOREIGN PATENT DOCUMENTS 35-16149  10/1960  Japan .................. 335/295

Primary Examiner—George Harris
Attorney, Agent, or Firm—Graybeal & Cullom

[57] ABSTRACT

A switchable permanent magnetic chuck including a housing which has one open end and a face plate which covers the open end of the housing. The face plate comprises a plurality of elongated magnetic pole members and a plurality of elongated non-magnetic members, both members being arranged in an alternately juxtaposed manner. The permanent magnetic chuck further included a plurality of first permanent magnets each disposed between adjacent magnetic pole members of the face plate so as to give alternately inverted magnetized directions in the transverse direction of the magnetic pole members. In the housing is enclosed a movable member which is movable in the transverse direction of the magnetic pole members, and on the movable member are disposed a plurality of second permanent magnets in a corresponding relation to the magnetic pole members. The permanent magnets on the movable member, which have pole faces slidably opposed to the magnetic pole members, are adapted to cooperate with the first permanent magnets for bringing the face plate selectively into magnetically excited and non-excited states.

7 Claims, 4 Drawing Figures

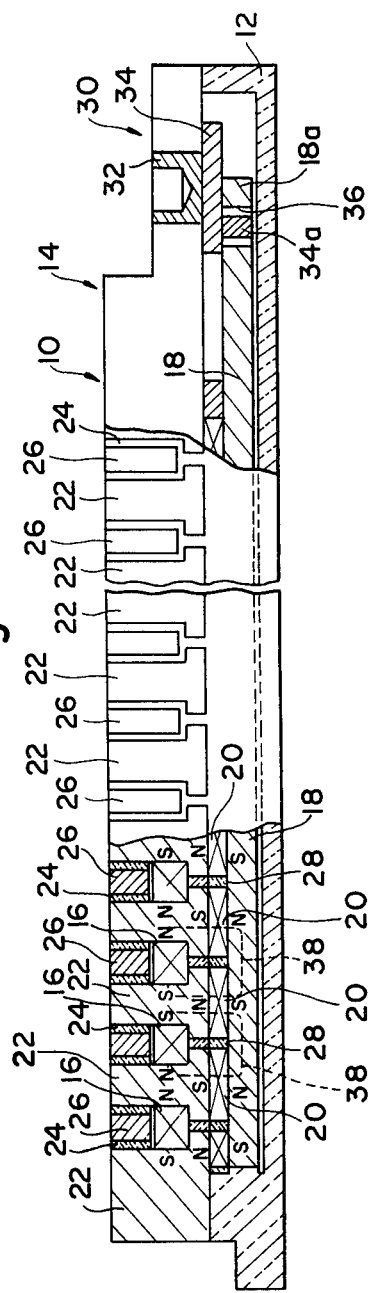
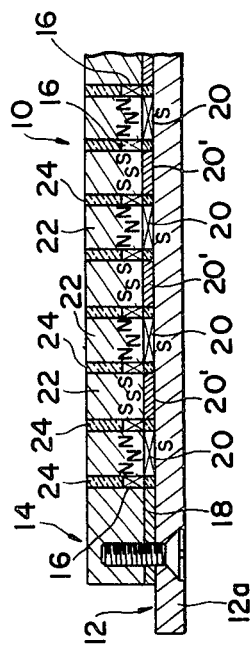
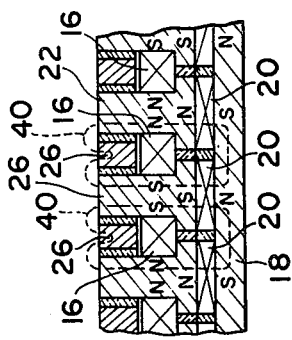
Fig. 2
Fig. 4
Fig. 3

SWITCHABLE PERMANENT MAGNETIC CHUCK

BACKGROUND OF THE INVENTION (1) Field of the Invention

The present invention relates to a permanent magnetic chuck capable of being switched over between a magnetically excited state and a non-excited state. More particularly, it is concerned with a switchable permanent magnetic chuck capable of being switched over between a magnetically excited state and a non-excited state by changing a relative positional relation between fixed permanent magnets and movable permanent magnets.

(2) Description of the Prior Art

As a conventional switchable permanent magnetic chuck there is known the permanent magnetic chuck disclosed in Japanese Patent Publication no. 16149/60. This conventional permanent magnetic chuck is provided with a housing having one open end; a face plate comprising a plurality of elongated magnetic pole members and a plurality of non-magnetic members, the pole members and the non-magnetic members being arranged in an alternately juxtaposed manner across the open end of the housing so as to cover this open end; a plurality of first permanent magnets fixed to the face plate; and a plurality of second permanent magnets fixed to a movable member which is enclosed in the housing so as to be movable in the transverse direction, namely, the juxtaposed direction, of the magnetic pole members and non-magnetic members.

In the above conventional permanent magnetic chuck, the first permanent magnets are each disposed between adjacent magnetic pole members of the face plate to give alternatively inverted magnetized directions in the transverse direction of the magnetic pole members so that the opposed faces between adjacent first permanent magnets are of the same magnetic pole. The movable permanent magnets are arranged in the moving direction of the movable member at predetermined intervals so that the opposed faces between adjacent movable permanent magnets are of the same magnetic pole, with a pole piece corresponding to the magnetic pole member being disposed therebetween.

According to the above conventional chuck, the face plate can be brought into a magnetically excited state by moving the second or movable permanent magnets which are magnetized in the same direction as the first or fixed permanent magnets, to positions just under the first permanent magnets. The face plate can be brought also into a non-excited state by moving the second permanent magnets which are magnetized in the direction opposite to the magnetized direction of the fixed permanent magnets, to positions just under the first permanent magnets.

In the magnetically excited state mentioned above, magnetic fluxes from the second permanent magnets are conducted to the magnetic pole members of the face plate not directly but through the pole pieces which are in contact with the magnetic pole faces of the movable permanent magnets. Because of such a construction, the foregoing conventional chuck has been disadvantageous in that the magnetic fluxes conducted from the second permanent magnets to the face plate in the magnetically exicted state leak in a relatively large amount, thus causing a large magnetic loss.

SUMMARY OF THE INVENTION

Accordingly, it is the object of the present invention to provide a permanent magnetic chuck whose magnetic loss is relatively small.

The present invention has been accomplished in view of the point that in the conventional permanent magnetic chuck the second permanent magnets are arranged so that their magnetized directions run along the moving direction of the movable member which supports the permanent magnets and therefore it is impossible for the second permanent magnets to have their magnetic pole faces opposed directly to the magnetic pole members. More particularly, the present invention is characterized in that the movable magnets are supported on the movable member so that their magnetic pole faces are slidably opposed to the magnetic pole members of the face plate to thereby decrease the flux leakage between the movable permanent magnets and the face plate.

BRIEF DESCRIPTION OF THE DRAWINGS

FIG. 2 is a partially cut-away side view of the permanent magnetic chuck of FIG. 1 in a magnetically non-excited state;

FIG. 3 is a view similar to FIG. 2, showing the permanent magnetic chuck of FIG. 1 in a magnetically excited state; and FIG. 4 is a view similar to FIG. 3, showing another embodiment of the present invention.

DESCRIPTION OF PREFERRED EMBODIMENTS

Figure 1:
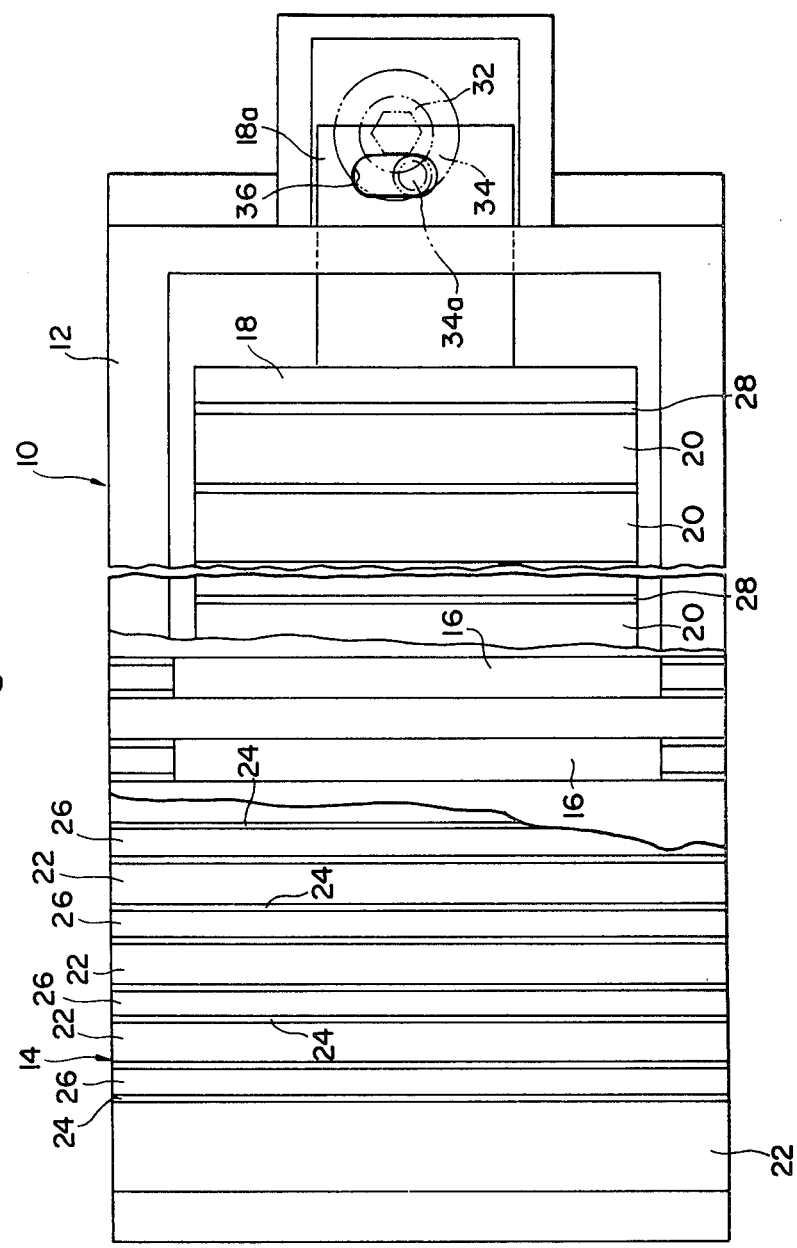
FIG. 1 is a partially cut-away plan view of a permanent magnetic chuck according to an embodiment of the present invention.

Referring to FIG. 1, a permanent magnetic chuck 10 according to the present invention includes a housing 12 having an open end, a face plate 14 which covers the open end of the housing, a plurality of first permanent magnets 16 arranged in the face plate 14, a plurality of second perrmanent magnets 20 supported on a movable member 18 which is enclosed in the housing 12.

In the illustrated embodiment, the housing 12 is formed of a non-magnetic material such as aluminum and has a rectangular shape as a whole. The face plate 14 comprises a plurality of elongated magnetic pole members 22 and a plurality of elongated non-magnetic members 24, the pole members 22 and the non-magnetic members 24 extending across the opening portion of the housing 12 in the direction of the width of the housing. Both members 22 and 24 are arranged alternately side by side in the longitudinal direction of the housing 12 and are connected together to constitute the face plate 14. Further, as heretofore known, a plurality of magnetic pole members 26 are embedded in the upper surfaces of nonmagnetic members 24 to subdivide the pole pitch of the face plate 14.

The first permanent magnets 16 are disposed in the face plate 14 and extend in the direction of the width of the face plate. As is clearly shown in FIG. 2, the permanent magnets 16 are each disposed between adjacent pole members 22 and under each of the auxiliary pole members 26 so as to give alternately inverted magnetized directions in the transverse direction of the magnetic pole members, with magnetic pole faces of the same pole being opposed to each other.

In the embodiment shown in FIGS. 1 and 2, the movable member 18 is a plate member formed of a magnetic material. The plate member 18 is disposed below the face plate 14 in parallel with the face plate, and it is movable in the longitudinal direction of the housing 12 which direction is coincident with the juxtaposed direction, i.e. the transverse direction, of the pole members 22 and the non-magnetic members 24. The second permanent magnets 20, which are supported on the plate member 18, extend in the direction of the width of the housing 12 and are arranged in the moving direction of the plate member 18 in a corresponding relation to the magnetic pole members 22 of the face plate 14. The permanent magnets 20 are each magnetized in the direction of the width of the plate member 18, namely, in a direction perpendicular to the moving direction of the plate member, and are arranged so as to give alternately inverted magnetized directions in the juxtaposed direction thereof, namely, the transverse direction of the pole members 22. Thus, the magnetic pole faces of the second or movable permanent magnets 20 with alternately inverted poles in the juxtaposed direction thereof are slidably opposed to the lower end faces of the pole members 20. Between adjacent permanent magnets 20 is disposed a spacer 28 formed of a non-magnetic material. The spacer 28 may be omitted.

The plate member 18 is provided at one end thereof with an extension 18a extending in the longitudinal direction of the plate member 18. Associated with the extension 18a is an operating mechanism 30 for giving to the plate member 18 a movement corresponding to one arrangement pitch of the permanent magnet 20. In the illustrated embodiment, the operating mechanism 30 is provided with an operating shaft 32 which is rotatably supported by the face plate 14 and an eccentric cam plate 34 fixed to the lower end of the operating shaft 32. The cam plate 34 has an eccentric shaft 34a fitted in a slit 36 formed in the extension 18a. Consequently, the plate member or the movable member 18 can be moved by one arrangement pitch of the permanent magnet 20 by rotating the operating shaft 32. In this way, the movable member 18 can be moved between the non-exicted position shown in FIG. 2 and the excited position shown in FIG. 3.

In the non-excited position shown in FIG. 2, each movable permanent magnet 20 is positioned just under each magnetic pole member 22 so that its pole face having a pole (S or N) opposite to the pole (N or S) of the fixed permanent magnets 16 which are opposed to the pole member 22, is opposed to the pole member. Consequently, the fixed permanent magnets 16 are each shorted with the associated movable permanent magnets 20 through the pole members 22, so that there are formed lines of magnetic induction of a closed loop as indicated at 38 in FIG. 2 which lines never cross the surface of the face plate 14. As a result, the surface of the face plate 14 is brought into the non-excited state.

On the other hand, in the magnetically excited position shown in FIG. 3, the movable permanent magnets 20 are each positioned just under each magnetic pole member 22 so that its pole face having the same pole (N or S) as the pole (N or S) of the pole faces of the fixed permanent magnets 16 which are opposed to the pole member 22, is opposed to the pole member. Consequently, the pole members 22 are magnetized so as to have alternately different poles in the juxtaposed direction thereof, so that there are formed lines of magnetic induction of a closed loop as indicated at 40 in FIG. 3 which lines cross the surface of the face plate 14. As a result, the surface of the face plate 14 is brought into the exicted state.

Since in this exicted state one pole face of each movable permanent magnet 20 is in direct contact with the corresponding pole member 22, the magnetic flux from the permanent magnet 20 to the pole member 22 and that from the pole member 22 to the permanent magnet 20 flow directly between the two without passing through such a pole piece as used in the foregoing conventional permanent magnetic chuck. Consequently, the magnetic path can be shortened to thereby decrease the flux leakage, thus permitting the magnetic force of the movable permanent magnets 20 to be exerted effectively on the face plate 14. As a result, in comparison with the foregoing conventional chuck, the magnetic loss can be decreased and the magnetic attraction of the face plate 14 can thereby be enhanced.

As the permanent magnets 16 and 20 there may be used Alnico magnets having a large reversible permeability, but in order to attain the reduction of a magnetic sliding resistance induced during movment of the movable member 18 and to thereby permits a smooth rotating operation of the rotatable operating shaft 32, namely, a light change-over operation, it is desirable to use a magnet having a small reversible permeability such as a ferrite magnet or a rare-earth metal magnet.

In the case of using a rare-earth metal magnet as the permanent magnets 16 and 20, since the rare-earth metal magnet has a magnetic flux density higher than that of the ferrite magnet, the permanent magnets 20 supported on the movable member 18 may be partially replaced by pole pieces 20' such as soft iron bars, as shown in FIG. 4. More particularly, in the case of the permanent magnetic chuck shown in the excited state in FIG. 4, through holes are formed in the direction of the thickness of the movable member 18, and the permanent magnets 20 and the pole pieces 20' are fitted in those through holes in an alternately arranged manner along the moving direction of the movable member 18. The permanent magnets 20 are arranged so as to have the same magnetized direction, that is, the permanent magnets 20 do not have alternately inverted magnetized directions in their juxtaposed direction. However, from the standpoint of a magnetic path of the magnetic circuit, the pole pieces 2' each disposed between adjacent permanent magnets 20 exhibit substantially the same function as the permanent magnets 20 having alternately inverted magnetized directions. In the embodiment illustrated in FIG. 4, the movable member 18 comprises a non-magnetic plate disposed below the face plate 14 in proximity thereto, and a base portion 12a of the housing 12 is formed of a magnetic material. Further, the non-magnetic members 24 of the face plate 14 have a smaller size in the vertical direction than the magnetic pole members 22 to define a recess under each non-magnetic member 24 which recess has an open lower end for enclosing therein each permanent magnet 16 described above so that the lower surface of the permanent magnet 16 is flush with the lower surface of the magnetic pole member 22.

In the permanent magnetic chuck 10 illustrated in FIG. 4, the closed flux loop in the magnetically excited state of the chuck partially passes each pole piece 20', but since one pole face of each permanent magnet 20 is in contact with the corresponding pole member 22, it is possible to attain reduction of the magnetic loss as compared with the foregoing conventional chuck. Further, in place of the pole piece 20' there may be used a permanent magnet similar to the permanent magnet 20, whereby a further reduction of the magnetic loss and the enhancement of the source of magnetic force can be attained, thereby permitting a further enhancement of the magnetic attraction of the face plate 14.

According to the present invention, as set forth hereinabove, since the movable permanent magnets are supported on the movable member so that their pole faces are slidably opposed to the magnetic pole members, it is possible to reduce the flux leakage between the movable permanent magnets and the face plate, thereby permitting reduction of the magnetic loss and a further enhancement of the magnetic attraction of the face plate.

What is claimed is:

1. A switchable permanent magnetic chuck including:
   a housing having one open end;
   a face plate comprising a plurality of elongated magnetic pole members and a plurality of elongated non-magnetic members, said magnetic pole members and said non-magnetic members being arranged in an alternately juxtaposed manner across said open end of said housing so as to cover said open end;
   a plurality of first permanent magnets each disposed between adjacent said magnetic pole members of the face plate so as to give alternately inverted magnetized directions in the transverse direction of said magnetic pole members; and
   a plurality of second permanent magnets arranged and supported on a movable member in a corresponding relation to said magnetic pole members for bringing said face plate selectively into magnetically excited and non-excited states in cooperation with said first permanent magnets, said second permanent magnets having magnetic pole faces slidably opposed to said magnetic pole members, said movable member being enclosed in said housing so as to be movable in the transverse direction of said magnetic pole members and said non-magnetic members.

2. A switchable permanent magnetic chuck according to claim 1, wherein said movable member comprises a plate member disposed within said housing in proximity to and parallel with said face plate and wherein said second permanent magnets are respectively fitted in through holes formed in said plate member so as to have a magnetized direction along the thickness direction of said plate member.

3. A switchable permanent magnetic chuck according to claim 1, wherein said non-magnetic members have a smaller size in the vertical direction than said magnetic pole members to define a recess under each said non-magnetic member which recess has an open lower end for enclosing therein each said first permanent magnet so that the lower surface of the permanent magnet is flush with the lower surface of each said magnetic pole member.

4. A permanent magnetic chuck according to claim 1, which further includes a plurality of auxiliary magnetic pole members embedded in the upper surfaces of said non-magnetic members and wherein said first permanent magnets are disposed under and in a corresponding relation to said auxiliary magnetic pole members.

5. A switchable permanent magnetic chuck according to claim 1, wherein said first and second permanent magnets have a low reversible permeability.

6. A switchable permanent magnetic chuck according to claim 5, wherein said first and second permanent magnets are ferrite magnets and wherein said second permanent magnets are arranged so as to give alternately inverted magnetized directions along the moving direction of said movable member.

7. A switchable permanent magnetic chuck according to claim 5, wherein said first and second permanent magnets are rare-earth metal magnets and wherein said second permanent magnets are arranged in the moving direction of said movable member alternately with pole pieces supported on said movable member so that the second permanent magnets have the same magnetized direction.

* * * * *